(12) United States Patent
Corson

(10) Patent No.: US 9,531,043 B2
(45) Date of Patent: Dec. 27, 2016

(54) ELECTROCHEMICAL CELL UNIT FOR A SECONDARY BATTERY

(71) Applicant: Belenos Clean Power Holding AG, Bienne (CH)

(72) Inventor: Donald Corson, Yverdon-les-Bains (CH)

(73) Assignee: Belenos Clean Power Holding AG, Bienne (CH)

( * ) Notice: Subject to any disclaimer, the term of this patent is extended or adjusted under 35 U.S.C. 154(b) by 340 days.

(21) Appl. No.: 13/901,040

(22) Filed: May 23, 2013

(65) Prior Publication Data

US 2013/0323572 A1    Dec. 5, 2013

(30) Foreign Application Priority Data

May 29, 2012 (EP) .................................... 12169776

(51) Int. Cl.
| | | |
|---|---|---|
| *H01M 10/50* | (2006.01) |
| *H01M 10/647* | (2014.01) |
| *H01M 10/65* | (2014.01) |
| *H01M 2/10* | (2006.01) |
| *H01M 10/615* | (2014.01) |
| *H01M 10/6557* | (2014.01) |
| *H01M 10/6555* | (2014.01) |
| *H01M 10/613* | (2014.01) |
| H01M 10/6567 | (2014.01) |

(52) U.S. Cl.
CPC ....... *H01M 10/5032* (2013.01); *H01M 2/1072* (2013.01); *H01M 10/613* (2015.04); *H01M 10/615* (2015.04); *H01M 10/647* (2015.04); *H01M 10/65* (2015.04); *H01M 10/6555* (2015.04); *H01M 10/6557* (2015.04); *H01M 10/6567* (2015.04); *H01M 2220/20* (2013.01)

(58) Field of Classification Search
CPC .. H01M 10/65; H01M 10/647; H01M 10/655; H01M 10/6555; H01M 10/6557
See application file for complete search history.

(56) References Cited

U.S. PATENT DOCUMENTS

| | | | |
|---|---|---|---|
| 6,653,002 | B1 | 11/2003 | Parise |
| 2010/0266883 | A1 | 10/2010 | Koetting et al. |
| 2011/0104545 | A1 | 5/2011 | Meintschel et al. |
| 2013/0115506 | A1* | 5/2013 | Wayne et al. ................. 429/120 |

FOREIGN PATENT DOCUMENTS

| | | |
|---|---|---|
| WO | 2010/071463 A1 | 6/2010 |
| WO | 2011/073426 A1 | 6/2011 |
| WO | 2011/146919 A2 | 11/2011 |

OTHER PUBLICATIONS

European Search Report for EP 12 16 9776.

* cited by examiner

*Primary Examiner* — Ladan Mohaddes
(74) *Attorney, Agent, or Firm* — Sughrue Mion, PLLC

(57) ABSTRACT

The present invention relates to an electric cell unit for a secondary battery as well as to such a secondary battery module. The electric cell unit comprises:
 a first electric cell (12) enclosed by a first casing (13),
 a second electric cell (14) enclosed a second casing (15), wherein at least one of first and second casings (13, 15) comprises a recessed portion (16, 18) extending along a side edge (11) thereof to form a receptacle (30), which is adapted to receive at least one thermal transfer element (28).

9 Claims, 5 Drawing Sheets

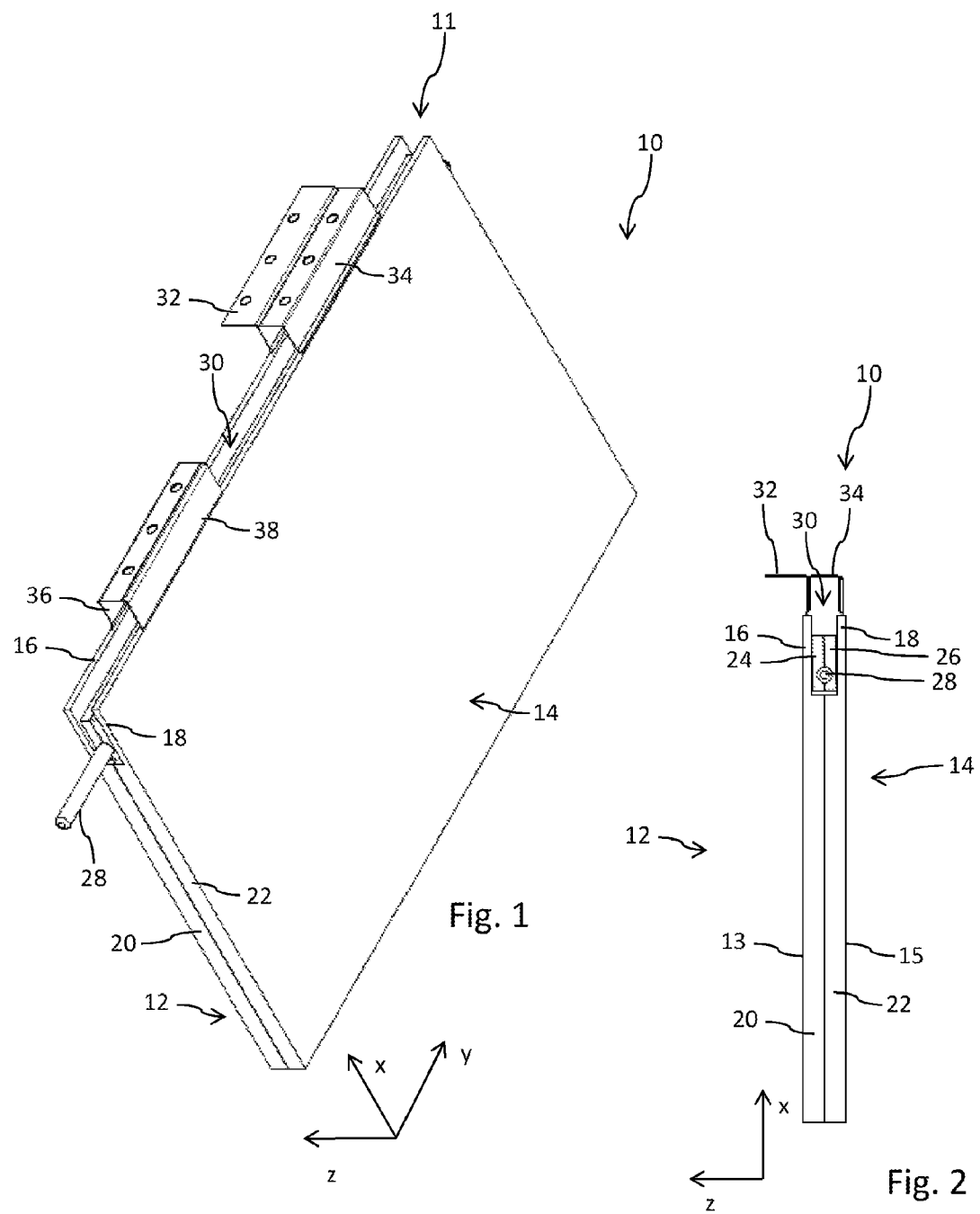

A-A

ELECTROCHEMICAL CELL UNIT FOR A SECONDARY BATTERY

This application claims priority from European Patent Application No. 12169776.7 filed May 29, 2012, the entire disclosure of which is incorporated herein by reference.

FIELD OF THE INVENTION

The present invention relates to the field of secondary, hence rechargeable batteries, and particularly refers to space-efficient thermal management as well as to space-and weight-optimized housing concepts for such batteries.

BACKGROUND AND PRIOR ART

Electric energy storage may be provided by secondary batteries, such like lithium-ion batteries. Such batteries but nearly all kind of secondary batteries should be operated within a predefined temperature range. For instance, at very low temperature, e.g. lower than −10° C., battery performance declines and efficiency may drop remarkably. At higher operating temperatures, e.g. around 40° C. and above, the economic life-time as well as performance and capacity of such batteries typically reduces.

These thermal conditions require that such batteries and battery modules have either to be heated or cooled appropriately. Consequently, there is a need for an adequate thermal management for batteries.

Electrochemical cell shapes are generally classified as either prismatic or cylindrical. Cylindrical cells have cylindrical housings. Prismatic cells have prismatic housing shapes, such as parallelepipeds. Common examples of prismatic cells include standard 12 V car batteries. An electrochemical cell can be, for example, a lithium ion cell.

Lithium-ion batteries are often packaged in so-called "pouch cells". An advantage of pouch cells is that the traditional metallic cylinder and glass to metal electrical feed-through is replaced by a relatively inexpensive foil packaging similar to what is used in the food industry. The foil is often a lamination film made from aluminum. The electrical contacts generally consist of conductive tabs that are welded to the electrode and sealed in the pouch material.

Document WO 2010/071463 A1 describes electrochemical cells placed inside a housing which are in thermal contact with a Peltier cell. The Peltier cell provides heat transfer into or out of a cell pack, whereas thermal-conducting separating plates in contact with at least one sidewall are placed inside said housing with the electrochemical cells placed between the plates. There, a sidewall of the housing is in contact with said separating plates and is further in thermal contact with the Peltier cell.

Moreover, the separating plates sandwiched between electrochemical cells have back edges bent at an angle of 90° contacting with the sidewall. Those back edges are further riveted together with said sidewall.

Since the separating plates protrude from lateral edges of the electrochemical cells, the cells have to be positioned and assembled at a particular distance from the sidewall of the housing. As a consequence, the interior space of the housing cannot be completely filled with electrochemical cells.

It is therefore an object of the present invention to provide a space-optimized housing for an electric battery, which provides improved thermal management. It is a further aim to optimize size and weight of a secondary battery together with an efficient cooling or thermal management of the battery.

SUMMARY OF THE INVENTION

In a first aspect, the present invention provides an electrochemical cell unit for a secondary battery. The electrochemical cell unit comprising:
a first prismatic pouch cell comprising a first electrochemical cell enclosed by a first prismatic pouch made of flexible foil,
a second prismatic pouch cell comprising a second electrochemical cell enclosed by a second prismatic pouch made of flexible foil,
each prismatic pouch cell further comprising current collecting tabs attached to electrodes of the electrochemical cell, leaving the pouch through a recessed portion extending along a side edge of the prismatic pouch, and sealed between layers of the flexible foil,
wherein the first and second prismatic pouch cells are stacked in such a way as to maintain an empty space between the recessed portions thereof, so as to form a receptacle between the first and second prismatic pouch cells, the receptacle being adapted to receive at least one thermal transfer element,
wherein the electrochemical cell unit further comprises a frame at least partially laterally enclosing the first and the second prismatic pouch cells and comprising a strut extending across the frame, along an outside surface of the recessed portion of one of the first and second prismatic pouch cells, the outside surface facing away from the receptacle.

By providing a recessed portion at a lateral side of first and second prismatic pouch cells, the thermal transfer element can be arranged in such a way, that it at least partially overlaps with the first and/or with the second prismatic pouch cell. The thermal transfer element typically extends along the recessed portion and hence along the side edge of first and second prismatic pouch. It may be embedded in or may be surrounded by the at least one recessed portion.

The at least one thermal transfer element may comprise a tubing providing thermal energy transfer by way of circulating a heat exchanging medium, such like a gaseous or liquid fluid. The thermal transfer element may alternatively comprise a strip of a material generically providing sufficient heat transfer or transfer of thermal energy. For instance, the thermal transfer element may comprise a metal sheet, e.g. of copper, aluminum or of comparable metals or alloys providing sufficient thermal energy transfer.

By providing a receptacle in a structure comprising first and second prismatic pouch cells stacked to one another, the overall volume of a battery comprising a plurality of prismatic cells or electrochemical cell units can be reduced. At the same time, a thermal transfer element can be arranged in an overlapping configuration with a cell, thereby providing a thermal transfer means in direct contact or in direct vicinity with those portions of first and/or second pouch cells from which respective thermal energy may originate and dissipate when the secondary battery is in operation mode.

The recessed portion of first and/or second prismatic pouch is typically obtained by a region of the first and/or second pouch having a reduced thickness along a side edge of the prismatic pouch. Typically, the receptacle can be formed by the recessed portions of first and second prismatic pouches. The recessed portions feature a reduced thickness compared to a residual portion of the respective prismatic pouch. By stacking the respective prismatic pouch with another prismatic pouch of either identical or different geometry but at least covering the recessed portion, a receptacle can be formed between respective first and second pouches which is for instance accessible from a side edge of first and/or second prismatic pouches.

In another preferred aspect, the recessed portion of either one of the prismatic pouch cells extends flush with one of the main surfaces of the pouch. Here, first and second prismatic pouch cells are arranged such, that respective recesses of the first and second cells face towards each other to form the receptacle there between. In case the first and second recessed portions of first and second cells are located at or form side edges of respective cells having a reduced thickness, then a U-shaped receptacle can be provided when first and second recessed portions of first and second cells are arranged in a substantially overlapping manner.

The recessed portions of first and/or second casings may comprise a stepped-down profile, such that the recess or the receptacle formed by two overlapping recesses is of substantially rectangular shape. Alternatively, a transition from a residual or active portion of the casing towards the recessed portion may also be cone shaped or slanted in order to provide a receptacle of corresponding shape.

In a further preferred embodiment, at least one thermal coupling element thermally coupled with the at least one thermal transfer element is arranged in the receptacle between first and second electrochemical cells to fill a gap space between first and second casings and/or between first and second receptacles, respectively.

By means of at least one thermal coupling element, efficient transfer of thermal energy between the at least one recessed portion of first and/or second casing and the thermal transfer element extending through the receptacle can be provided. By means of the at least one thermal coupling element, inside facing surface portions of the receptacle can be effectively thermally coupled with the thermal transfer element.

A heat exchange between the thermal transfer element and the at least one recessed portion of first and/or second electrochemical cells can therefore be improved. Preferably, the at least one thermal coupling element provides a geometric interface between the geometric structure of the receptacle and the geometric structure of the thermal transfer element. The at least one thermal coupling element or a plurality of thermal coupling elements are designed to fill the entire gap between the recessed portions of first and second casings thereby almost entirely filling the receptacle formed between first and second recessed portions.

In a further preferred embodiment, first and second cells of the electrochemical cell unit comprise substantially identical geometries. Preferably, first and second electrochemical cells comprise a substantially planar geometry, which allows to assemble first and second cells in a stack to form an electrochemical cell unit comprising a pair of electrochemical cells. It is of particular benefit, when first and second cells of substantially identical geometry are arranged face to face in such a way, that recessed portions of first and second electrochemical cells face towards each other in stacking direction (z), such that laterally protruding portions integrally formed with active portions of respective battery cells are separated from each other with respect to the stacking direction (z) such that the receptacle is formed there between to receive the at least one thermal transfer element.

According to another preferred aspect the frame is preferably made of a plastic material, in particular of an injection moldable plastic material. The frame material may therefore comprise thermoplastic material, which may be structurally enhanced or reinforced, e.g. by way of fibers. The frame laterally enclosing at least one of first and second electrochemical cells may directly form part of a modular housing of the secondary battery. Preferably, each electrochemical cell may be preassembled in a respective frame to provide a corresponding frame-electrochemical cell-preassembly. The electrochemical cells may be positively or frictionally engaged with the surrounding frame.

The at least one thermal transfer element typically intersects the frame in order to provide a sufficient thermal energy transport through the frame.

In a further preferred embodiment, the frame comprises at least one frame element to receive one of first and second electrochemical cells. Preferably, the frame comprises two frame elements, each of which being adapted to receive and to assemble one of first and second electrochemical cells therein. Hence, a first frame element is adapted to receive and to mount the first electrochemical cell whereas a second frame element is adapted to receive and to mount the second electrochemical cell element of the electrochemical cell unit.

The frame, in particular its frame element comprises mutually engaging frame portions, by way of which a series of frames can be stacked on one another in a well-defined, structurally stable and durable way. Since each frame element typically provides a mount and a mechanical support for an electrochemical cell, respective first and second electrochemical cells of an electrochemical cell unit can be mutually assembled simply by arranging first and second electrochemical cells in respective first and second frame elements and by mutually assembling first and second frame elements to establish and to provide an electrochemical cell unit.

During this assembly, recessed portions of first and second cells can be thermally coupled with the at least one thermal transfer element and optionally with the at least one thermal coupling element.

In a further preferred embodiment, a thickness (D) of the frame element exceeds a thickness (d) of the electrochemical cell assembled therein by at least 3%, 5%, 8%, 10% or even by 15%. The thickness of the frame typically coincides with the stacking direction of various frame elements. Since the frame element is thicker in stacking direction (z) compared to the electrochemical cell assembled therein, various electrochemical cells adjacently located in a stack of frame-electrochemical cell-pre-assemblies are positioned at a predefined gap size there between. This way, the electrochemical cells may expand in thickness, hence in stacking direction without transferring mechanical tension to each other, to the surrounding frame structure and/or to respective end structures of a housing of a secondary battery.

Therefore, electrochemical cells assembled in a stack of frame elements may "breathe" and may freely expand in stacking direction (z) without imposing mechanical stress in a stack.

Typically, it is only the electrically active portion of an electrochemical cell that differs in thickness compared to the surrounding frame element and which comprises coated metal electrodes and non-conductive separators. In the region where electric contact portions (current collecting tabs) of the electrochemical cells are provided, adjacently located electrochemical cells are preferably densely and tightly packed or squeezed in stacking direction when surrounding frame elements are stacked on one another.

Since the electric contact portions of first and second electrochemical cells undergo geometric deformations or expansion to a much lesser extend compared to active portions of the electrochemical cells, a comparatively lose fitting of the recessed portion is neither required nor intended. Moreover, by establishing a rather tight fitting of recessed portions with a thermal transfer element squeezed in a respective receptacle, a sufficient thermal coupling can be established and sustained.

According to the invention the frame comprises at least one strut extending across the frame. The strut serves to structurally enhance or to reinforce the frame. Moreover, since electrodes as well the at least one thermal transfer element have to intersect the frame element, the frame itself either comprises an interrupted structure along its outer circumference or the frame may comprise recessed portions to guide electric contact electrodes and/or the at least one thermal transfer element there through. Such recesses or interruptions of the frame structure which naturally impose mechanical weakening can be mechanically and/or structurally compensated by means of the at least one strut.

In a preferred embodiment the at least one strut substantially flushes with the frame element as seen in stacking direction (z) of first and second electrochemical cells. Hence, as seen in stacking direction and perpendicular to the circumference of the frame element, the strut does not protrude from the frame element. Moreover, the strut extends inwardly as seen in stacking direction (z) to provide a kind of a spacer for supporting a tight fitting of recessed portions of the electrochemical cells and their at least one thermal transfer element arranged there between.

According to the invention, the strut of the frame element extends along an outside oriented portion of the recessed portion on the respective prismatic pouch of an electrochemical cell arranged in said frame. Hence, the strut typically extends along a back side of the recessed portion of an electrochemical cell casing that faces away from the thermal transfer element located between pair wise arranged electrochemical cells of an electrochemical cell unit.

It is of particular benefit, when according to another preferred embodiment the strut extends substantially parallel to the receptacle and/or substantially parallel to the thermal transfer element. This way, a pre-fitting or squeezing of the thermal transfer element between recessed portions of pair wise and face to face oriented electrochemical cells can be structurally enhanced and reinforced.

Moreover, by means of the at least one strut, the electrochemical cell can be easily and intuitively secured and fixed in the frame. This way, a plurality of frame-electrochemical cell-pre-assemblies can be preassembled to form a plurality of electrochemical cell units, each of which comprising a pair of electrochemical cells preassembled in a corresponding pair of frame elements.

Regarding the strut, its position and dimension with respect to the frame, it is of particular benefit and according to another preferred embodiment, when the at least one thermal transfer element is in tight thermal contact with at least one recessed portion of first and/or second prismatic pouch cell when a first frame element containing the first electrochemical cell is stacked with a second frame element containing the second electrochemical cell.

Even though the recessed portions of first and second electrochemical cells are then tightly fitted or tightly squeezed in stacking direction by means of at least one strut, a residual and electrochemically active portion of the electrochemical cells may still feature a particular gap size in stacking direction (z) due to a reduced thickness compared to the respective frame element.

This way, load-dependent or operation-condition-dependent geometric expansion of electrochemical cells may have a reduced or even eliminated impact on a housing of a secondary battery.

BRIEF DESCRIPTION OF THE DRAWINGS

In the following, a preferred embodiment of the invention will be described by making reference to the drawings, in which:

FIG. 1 schematically illustrates two isolated electrochemical cells having a thermal transfer element arranged there between, FIG. 2 shows a side view of the electrochemical cells of FIG. 1.

DETAILED DESCRIPTION

Figures 3, 4:
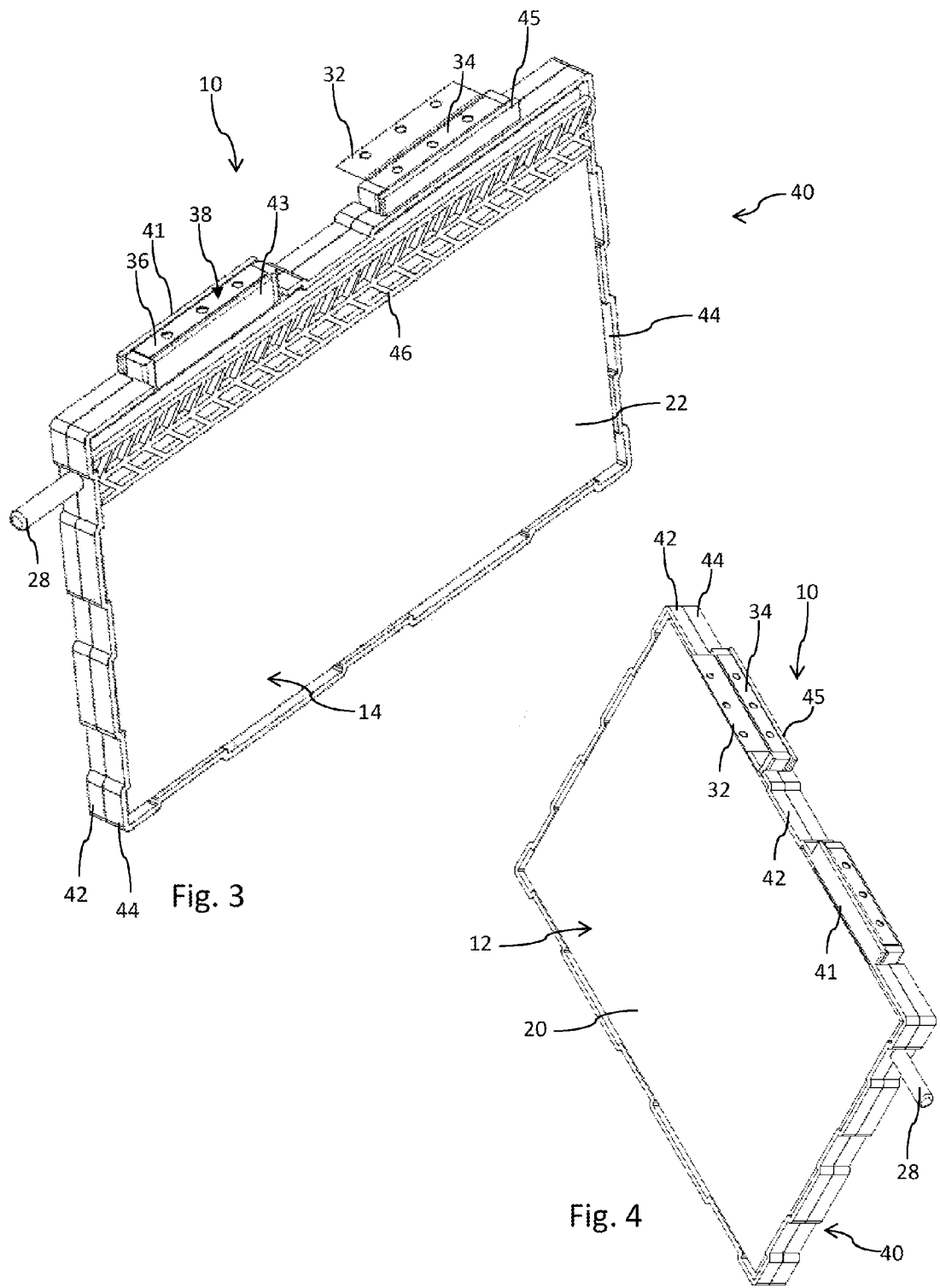
FIG. 3 shows the electrochemical cells according to FIG. 1 assembled in a frame according to a first perspective view.
FIG. 4 shows the electrochemical cell unit according to FIG. 3 in a different perspective view.

In FIGS. 1 and 2 first and second cells 12, 14 of an electrochemical cell unit 10 are shown in a perspective illustration and in a side view, respectively. The first electrochemical cell 12 comprises a recessed portion 16 towards an upper current collecting tab 32. Accordingly, also the second electrochemical cell 14 comprises a correspondingly shaped recessed portion 18 at its upper end. In a lower portion as illustrated in FIGS. 1 and 2, the electrochemical cells 12, 14 each comprise an active portion 20, 22, where layers of coated metal electrodes separated by non-conductive separators are arranged.

Each electrochemical cell 12, 14 is enclosed by a prismatic pouch 13, 15 surrounding the upper recessed portions 16, 18 as well as the lower electrically active portions 20, 22 of respective electrochemical cells 12, 14.

The electrochemical cells 12, 14 and their respective prismatic pouches 13, 15 comprise substantially identical geometries. As illustrated in FIGS. 1 and 2, the prismatic pouch cells 12, 14 are arranged face to face, such that a receptacle 30 is provided between a first recessed portion 16 and a second recessed portion 18 of first and second electrochemical cells 12, 14, respectively. The receptacle 30 thus formed at an upper side edge 11 of the electrochemical cell unit 10 is adapted to receive at least one thermal transfer element 28, which according to the embodiment as shown in FIGS. 1 to 8 may comprise a tube for circulating a heat exchanging medium, such like a coolant.

Since the thermal transfer element 28 is of smaller dimensions compared to the gap between the stepped down recessed portions 16, 18, a residual space between the recessed portions 16, 18 is filled and stuffed with thermal coupling elements 24, 26, which provide sufficient, constant and persistent exchange of thermal energy between the recessed portion 16, 18 and the thermal transfer element 28.

As illustrated in FIGS. 1 and 2, the recessed portions 16, 18 of respective pouches 13, 15 provide an electric contact portion of the cells 12, 14. Accordingly, at a free and upper end of the recessed portions 16, 18 various current collecting tabs 32, 34, 36, 38 extend from the side edge 11 of the electrochemical cells 12, 14. Apart from the design and shape of the various current collecting tabs 32, 34, 36, 38, first and second electrochemical cells 12, 14 are here rather identical.

The electrochemical cells 12, 14 are further of planar and even prismatic geometry. Hence, an electrically active portion 20, 22 substantially extends in a transverse plane, as illustrated by the x- and y-axes according to FIG. 1.

Figure 7:
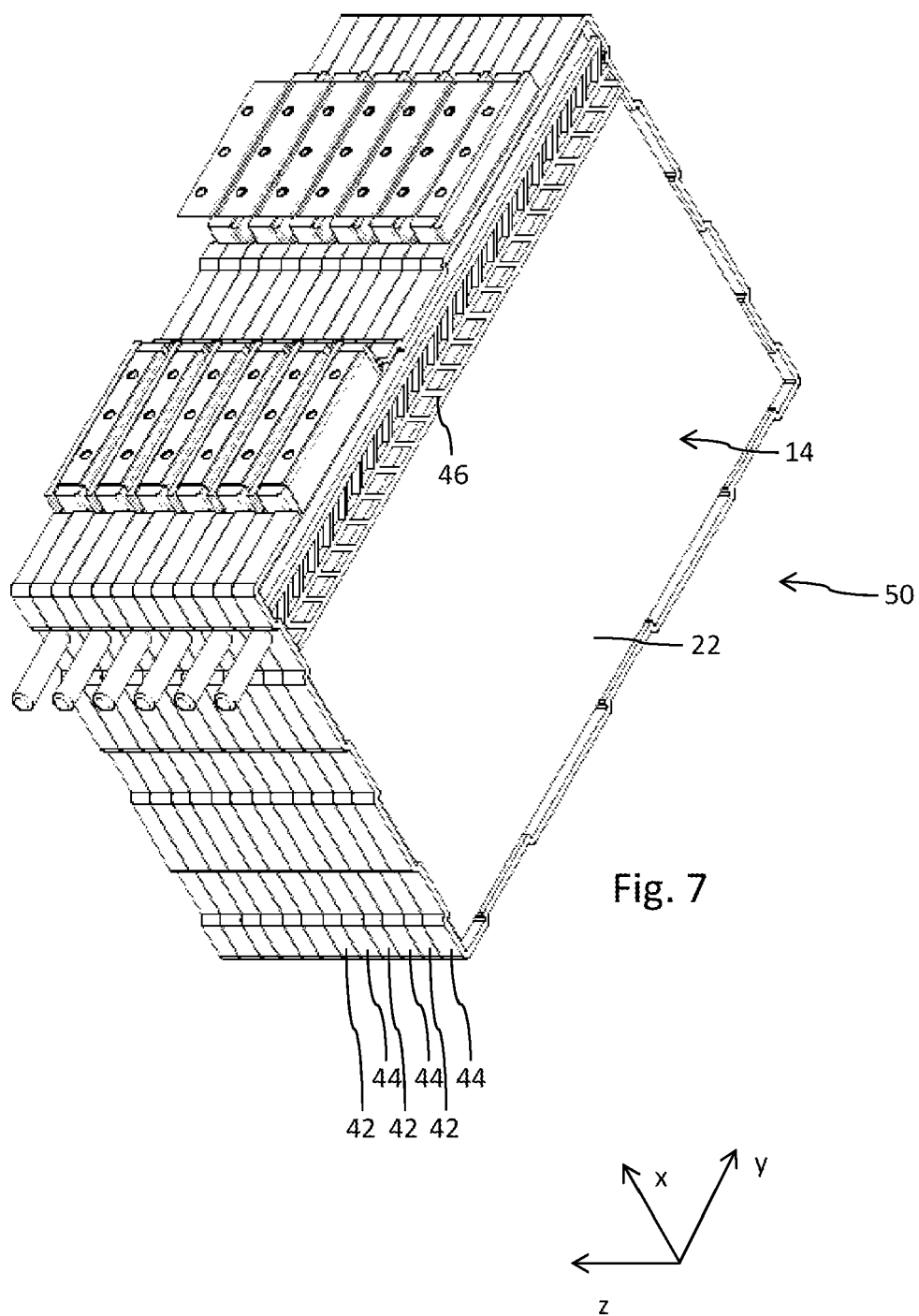
FIG. 7 is illustrative of a stack of electrochemical cell units as seen from a first perspective and FIG. 8 shows the stack of FIG. 7 from another perspective.
Figure 8:
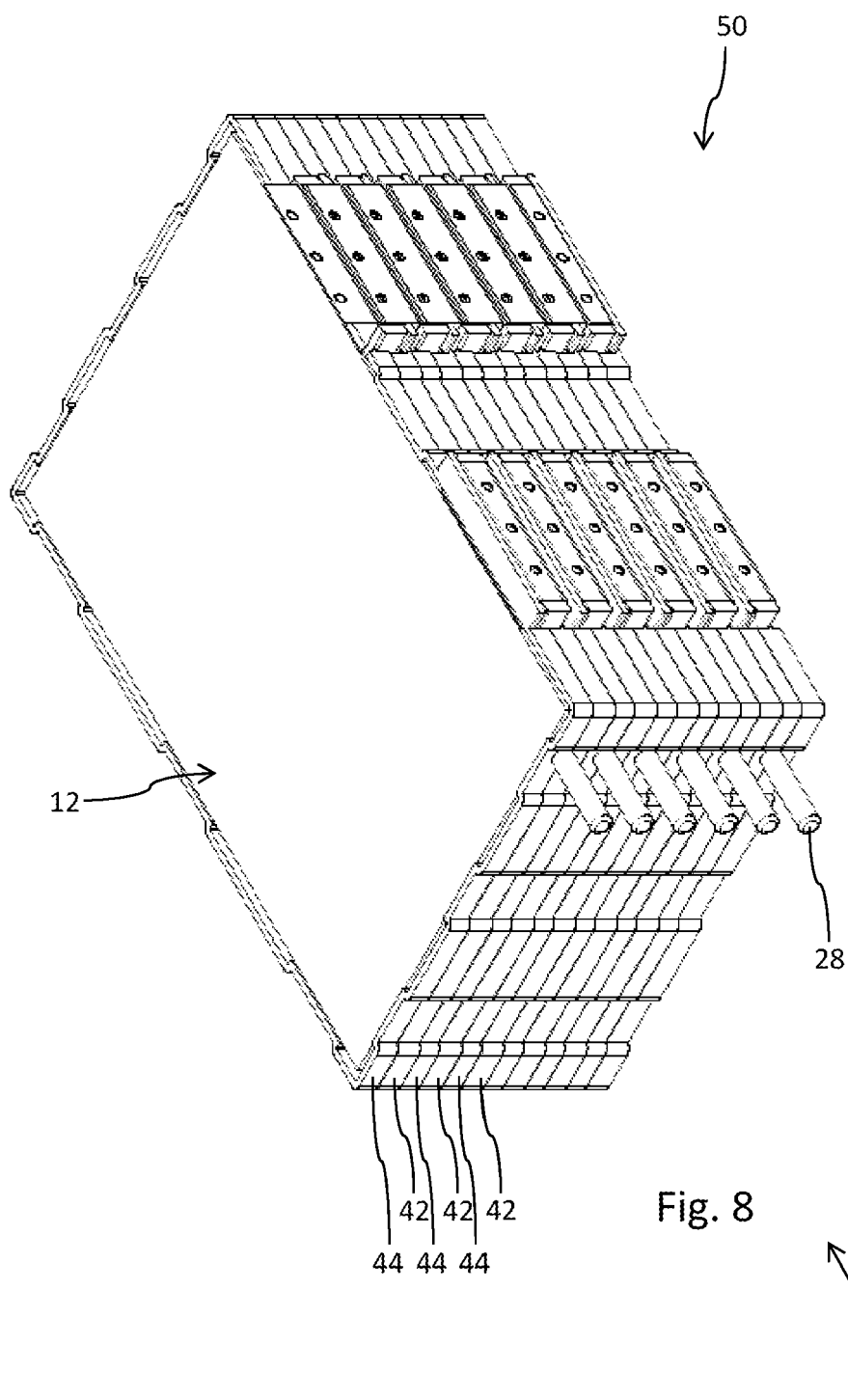

For providing a secondary battery module 50 as illustrated for instance in FIGS. 7 and 8, numerous electrochemical cell units 10, each of which comprising first and second electrochemical cells 12, 14 are to be assembled in a stacked configuration in a stacking direction (z) as becomes apparent from the sketch of FIGS. 7 and 8.

According to the illustrated example, the identical electrochemical cells are electrically connected in series. As each cell unit 10 is formed of a pair of electrochemical cells 12, 14 facing each other, the positive tab of a first cell in each pair faces the negative tab of the second cell, and the negative tab of the first cell faces the positive tab of the second cell. Referring again to FIG. 1, one can observe that the L-shaped current collecting tabs 36 and 38 of cells 12 and 14 overlap each other so as to be in contact. In contrast, current collecting tab 32 of electrochemical cell 12 angles away from current collecting tab 34 of electrochemical cell 14. Tabs 32 and 34 are therefore not in contact with each other. As visible in FIGS. 7 and 8, tab 32 extends towards the next electrochemical cell in the stack, so as to make contact with the next pair of cells.

For providing a universal and adaptable design of a battery module 50, the single electrochemical cells 12, 14 of an electrochemical cell unit 10 are each arranged in respective frame elements 42, 44 as shown in FIGS. 3 to 6. Here, a pair of frame elements 42, 44 forms a frame 40 of the electrochemical cell unit 10, which can be preassembled as illustrated in FIGS. 3 and 4. The frame elements 42, 44 are preferably made of a plastic material. They may comprise a thermoplastic injection moldable material allowing for cost efficient mass production.

The frame elements 42, 44 are to be intersected by various contact tabs 32, 34, 36, 38 of first and second electrochemical cells 12, 14. Moreover, first and second frame elements 42, 44 are intersected by the thermal transfer element 28, extending through and protruding from the left side of the frame 40 as shown in FIG. 3. The frame 40, in particular its two frame elements 42, 44 are adapted to receive and to hold a respective electrochemical cell 12, 14. By substantially enclosing the electrochemical cells 12, 14 in circumferential transverse direction (x, y), the electrochemical cell 12, 14 can be sufficiently fixed and mounted with regard to the transverse plane (x, y).

In stacking direction (z), the frame elements 42, 44 are open. Here, the first frame element 42 comprises a kind of through opening which is adapted to receive the entirety of first and second electrochemical cells 12, 14, whereas the second frame element 44 comprises a strut 46 extending across the respective frame element 44. The strut 46 extends substantially parallel to the side edge 11 and therefore extends substantially parallel to the elongation of the thermal transfer element 28.

Figure 6:
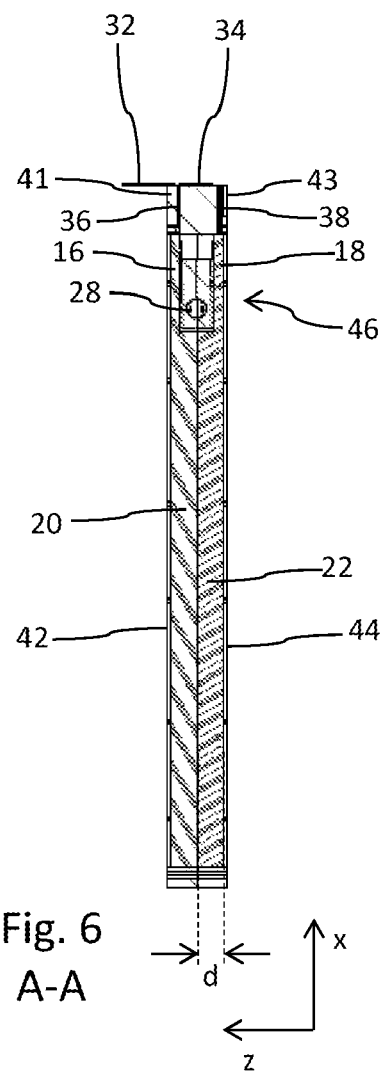
FIG. 6 shows a cross section A-A according to FIG. 5.

Furthermore, as can be seen from FIGS. 3 and 6, the strut 46 does not protrude from the circumferential frame element 44 but flushes with the plane of the frame element 44 as shown in FIG. 3. Here, the strut 46 provides mechanical reinforcement of the frame element 44 in the region, where the frame elements 42, 44 are intersected by current collecting pads 32, 34, 36, 38 and/or by the thermal transfer element 28. An inevitable structural weakening of the frame elements 42, 44 due to the intersections may be structurally compensated by means of the strut 46.

Moreover, the strut 46 also serves to provide a squeezing and tight fit of the thermal transfer element 28 and the thermal coupling elements 24, 26 inside the receptacle 30. Furthermore, the strut 46 also serves to compensate slight geometrical variations of the thickness of the frame elements 42, 44 compared to the electrochemical cells 12, 14. In typical configurations, the thickness (d) of the active portions 20, 22 of first and second cells 12, 14 is less compared to the corresponding thickness (D) of first and second frame elements 42, 44 as seen in stacking direction (z). These geometric differences allow to assemble a stack 50 of electrochemical cell units 10, wherein neighboring and adjacently arranged electrochemical cells 12, 14 are separated by a particular gap, at least in the region of their active portions, 20, 22.

Figure 5:
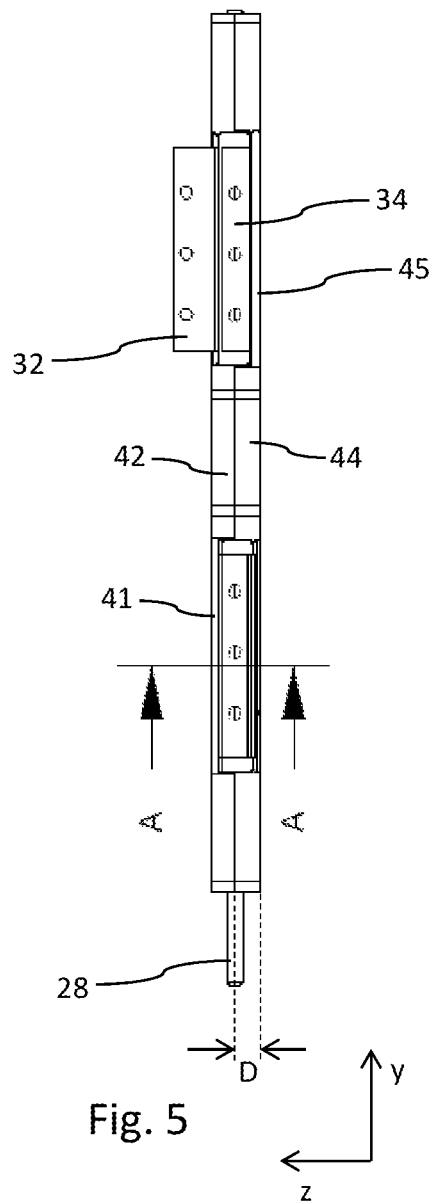
FIG. 5 is illustrative of the electrochemical cell unit according to FIGS. 3 and 4 as seen from the top.

As schematically illustrated in FIGS. 5 and 6, at least the frame element 44 comprises a thickness (D) in stacking direction (z). In comparison thereto, a thickness (d) of an active portion 22 of an electrochemical cell 14 is at least slightly reduced, such that at least a small gap in stacking direction between a border of the respective frame element 44 and the plane of the surface of the active portion 22 arises.

This way, the electrically active portions 20, 22 may expand in stacking direction (z) under operating conditions and/or under varying thermal conditions. The varying thickness and the gap in stacking direction between surrounding frame elements 42, 44 and active portions 20, 22 of electrochemical cells 12, 14 allows the active portions 20, 22 to "breathe" at least to a predefined extend.

By providing a strut 46 with a predefined thickness in stacking direction (z), such "breathing" and a lose fitting of recessed portions 16, 18 can be effectively prevented. This way, the strut 46 also serves as a kind of spacer, by way of which recessed portions 16, 18, thermal coupling elements 24, 26 as well as the thermal transfer element 28 arranged there between can be tightly fitted and squeezed in stacking direction (z) irrespective of the operation mode and operation conditions of the electrochemical cell unit, when a plurality of cell units are arranged in a stack 50 as shown in FIGS. 7 and 8.

From FIG. 4 it follows, that the first frame element 42 is strutless. However, the assembly of first and second electric cells 12, 14 with thermal coupling elements 24, 26 and a thermal transfer element 28 sandwiched there between is fixed with respect to the frame 40 in stacking direction (z) as soon as the frame 40 as shown in FIG. 4 is stacked with a substantially identical frame in such a way, that the strut 46 of the adjacently located frame 40 also abuts with a neighboring electrochemical cell 12 of an adjacently arranged electrochemical cell unit 10.

Furthermore, as illustrated in FIGS. 3 to 6, the frame elements 42, 44, comprise separating members 41, 43, 45 protruding outwardly from the frame structure but extending substantially parallel to the plane defined by the frame elements 42, 44. Such separating members 41, 43, 45 provide a mechanical support for various current collecting tabs 34, 36, 38 extending through the respective frame elements 42, 44. Moreover, the separating members 41, 43, 45 provide electrical insulation for the tabs 34, 36, 38 and help to prevent that neighboring tabs 36, 38 of adjacently arranged electrochemical cell units 10 get in direct contact with each other, e.g. during assembly of a stack 50.

This way, a risk of electric shortcuts during assembly but also in the event of e.g. an impact-induced deformation can be effectively reduced or even eliminated. The separating members 41, 43, 45 are preferably integrally formed with the frame elements 42, 44 and may further enhance their mechanical stability, stiffness and/or rigidity.

In effect, by providing a recessed portion 16, 18 at a side edge 11 of first and second electrochemical cells 12, 14 folded onto one another in a face to face configuration, an improved thermal management can be directly introduced into the area of electrochemical cell contacting, thereby allowing to reduce the overall size of a housing of a secondary battery module. Moreover, by means of the plastic frame 40 a rather simple, light weight and modular stacking system can be provided allowing to universally assemble a variety of electrochemical cell units to provide differently configured secondary battery modules 50.

LIST OF REFERENCE NUMERALS

10 electrochemical cell unit
11 side edge
12 prismatic pouch cell
13 prismatic pouch
14 prismatic pouch cell
15 prismatic pouch
16 recessed portion
18 recessed portion
20 active portion
22 active portion
24 thermal coupling element
26 thermal coupling element
28 thermal transfer element
30 receptacle
32 current collecting tab
34 current collecting tab
36 current collecting tab
38 current collecting tab
40 frame
41 separating member
42 frame element
43 separating member
44 frame element
45 separating member
46 strut
50 stack

What is claimed is:

1. An electrochemical cell unit for a secondary battery module, comprising:
   a first prismatic pouch cell comprising a first electrochemical cell enclosed by a first prismatic pouch made of flexible foil, the first electrochemical cell comprising a first recessed portion at its upper end,
   a second prismatic pouch cell comprising a second electrochemical cell enclosed by a second prismatic pouch made of flexible foil, the second electrochemical cell comprising a second recessed portion at its upper end,
   each prismatic pouch cell further comprising current collecting tabs attached to electrodes of the electrochemical cell, leaving the pouch through the recessed portion of the electrochemical cell, and sealed between layers of the flexible foil,
   wherein the first and second prismatic pouch cells are stacked and arranged in face to face contact with each other such that a receptacle is provided between the first recessed portion of the first electrochemical cell and the second recessed portion of the second electrochemical cell, the receptacle formed at an upper side edge of the electrochemical cell unit being adapted to receive at least one thermal transfer element inside the receptacle,
   wherein the electrochemical cell unit further comprises a frame at least partially laterally enclosing the first and the second prismatic pouch cells and comprising a strut extending across the frame, parallel to the side edge along an outside surface of the recessed portion from which the current collecting tabs of one of the first and second prismatic pouch cells are leaving, the outside surface facing away from the receptacle in a stacking direction of first and second prismatic pouch cell.

2. The electrochemical cell unit according to claim 1, wherein at least one thermal coupling element thermally coupled with the at least one thermal transfer element is arranged in the receptacle to fill a gap space between first and second recessed portions.

3. The electrochemical cell unit according to claim 1, wherein first and second prismatic pouch cells comprise substantially identical geometries.

4. The electrochemical cell unit according to claim 1, wherein the frame comprises at least one frame element to receive one of first and second prismatic pouch cells.

5. The electrochemical cell unit according to claim 4, wherein a thickness of the frame element exceeds a thickness of the electrochemical cell assembled therein by at least 3%.

6. The electrochemical cell unit according to claim 4, wherein the strut substantially flushes with the frame element in a stacking direction of first and second prismatic pouch cells.

7. The electrochemical cell unit according to claim 1, wherein the strut extends substantially parallel to the receptacle and/or substantially parallel to the thermal transfer element.

8. The electrochemical cell unit according to claim 1, wherein the at least one thermal transfer element is in tight thermal contact with at least one recessed portion of the first and/or the second prismatic pouch when a first frame element containing the first prismatic pouch cell is stacked with a second frame element containing the second prismatic pouch cell.

9. A secondary battery module comprising at least two electrochemical cell units according to claim 1 that are stacked to one another.

* * * * *